United States Patent
Guilloux et al.

(10) Patent No.: US 8,632,177 B2
(45) Date of Patent: Jan. 21, 2014

(54) METHOD FOR DETERMINING THE INSET OF A PROGRESSIVE ADDITION LENS

(75) Inventors: Cyril Guilloux, Charenton le Pont (FR); Isabelle Poulain, Charenton le Pont (FR); Soazic Mousset, Charenton le Pont (FR); Aude Contet, Charenton le Pont (FR)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 342 days.

(21) Appl. No.: 13/120,848

(22) PCT Filed: Sep. 22, 2009

(86) PCT No.: PCT/EP2009/062290
§ 371 (c)(1),
(2), (4) Date: Mar. 24, 2011

(87) PCT Pub. No.: WO2010/034727
PCT Pub. Date: Apr. 1, 2010

(65) Prior Publication Data
US 2011/0184830 A1    Jul. 28, 2011

(30) Foreign Application Priority Data
Sep. 24, 2008   (EP) .................................. 08305587

(51) Int. Cl.
*G02C 7/06* (2006.01)

(52) U.S. Cl.
USPC ............. 351/159.73; 351/159.06; 351/159.42

(58) Field of Classification Search
CPC .......... G02C 7/02; G02C 7/024; G02C 7/025; G02C 7/027; G02C 7/028; G02C 7/041; G02C 7/06; G02C 7/061
USPC ............. 351/159.06, 159.42, 159.73–159.75
See application file for complete search history.

(56) References Cited

U.S. PATENT DOCUMENTS

| | | | |
|---|---|---|---|
| 4,676,610 A * | 6/1987 | Barkan et al. ............ | 351/159.42 |
| 5,710,615 A * | 1/1998 | Kitani ..................... | 351/159.42 |
| 6,074,062 A | 6/2000 | Morris et al. | |
| 6,193,370 B1 | 2/2001 | Shirayanagi | |
| 6,712,467 B1 * | 3/2004 | Kitani ..................... | 351/159.42 |
| 8,061,838 B2 * | 11/2011 | Giraudet et al. ......... | 351/159.06 |
| 2004/0032565 A1 | 2/2004 | Yamakaji et al. | |
| 2011/0013137 A1 * | 1/2011 | Kitani ..................... | 351/169 |

FOREIGN PATENT DOCUMENTS

| | | |
|---|---|---|
| EP | 1 835 328 | 1/2008 |
| EP | 1 950 601 | 7/2008 |

* cited by examiner

*Primary Examiner* — Darryl J Collins
(74) *Attorney, Agent, or Firm* — Cozen O'Connor

(57) ABSTRACT

A method for determining the value of the inset of a progressive addition lens according to a wearer comprising the steps of: providing convergence data, determining from the convergence data the inset of the progressive addition lens considering at least the convergence data and the prismatic effect of the progressive addition lens.

12 Claims, 2 Drawing Sheets

METHOD FOR DETERMINING THE INSET OF A PROGRESSIVE ADDITION LENS

RELATED APPLICATIONS

This is a U.S. National Phase under 35 U.S.C. §371 of International Application No. PCT/EP2009/062290, filed on Sep. 22, 2009, and claims priority on European application No. 08305587.1, filed on Sep. 24, 2008, the entire content of which is hereby incorporated by reference.

This application claims the priority of European application no. 08305587.1 filed Sep. 24, 2008, the entire content of which is hereby incorporated by reference.

FIELD OF THE INVENTION

The present invention relates to a method for determining the value of the inset of a progressive addition lens according to a wearer.

BACKGROUND OF THE INVENTION

An ophthalmic progressive addition lens, or PAL, has an optical power that varies progressively along a line over the surface of this lens, known as meridian line. The meridian line connects a distance-vision point on the lens, to which the optical power and astigmatism of the lens are adapted in order to correct the distance vision of a wearer, to a near-vision point to which the optical power is adapted in order to correct the near vision of the wearer.

A method for vision correction traditionally includes measuring optical aberration data of a wearer's eye, usually performed by optometrists or ophthalmologists, determining the lens parameters and offering to the wearer a plurality of model lenses with different lens "designs".

The wearer's vision parameters are measured using for example trial lenses, an aberrometer, a wave-front sensor, grating or other known method and/or apparatus.

Other vision parameters can be obtained such as the wearer's vertex distance, pupil size, pupil distance, frame information, gaze directions, eye convergence.

The optical distribution of aberrations or optical "design" imparts the optical correction of the material. Given the infinite number of eyesight corrections, the numbers of designs is almost infinite.

For cost and manufacture reasons, only a limited number of "model designs", applied on the front surface of the lens is predetermined by the lens manufacturers.

Such "model designs" are of great importance when considering progressive addition lenses (PAL).

PAL have gained worldwide acceptance as the most performant ophthalmic lenses for correction of presbyopia because they provide comfortable vision at all distances.

A PAL is designed not only to restore a presbyope's ability to see clearly at all distances but also to optimally respect all physiological visual functions, in particular:
- foveal vision where coordination of the body, head and eye movements, in relation to the objects' location in the vision, defines the power value needed at each point of the progression. The field of gaze is determined by the natural coordination of horizontal eye and head movements;
- extra-foveal vision (provided by the periphery of the retina) which provides space and form perception and is directly influenced by the distribution of prism on the progressive addition lens surface. The variation of prismatic effects plays also a role in the wearer's comfort when movement is perceived;
- binocular vision where, for optimal fusion of the simultaneous perception of the two eyes, the images produced by the right and left lenses must be formed on corresponding retinal points and display similar optical properties in all directions of gaze.

Progressive addition lens designers work towards respecting these physiological functions and propose a limited number of optimized designs which are tested through rigorous clinical trials. A plurality of "model designs" is offered by each lens maker.

The optometrist or ophthalmologist proposes usually a lens "model design" that may be the result of an analysis of the viewing behavior of the wearer.

According to a known embodiment, an ophthalmic lens which is adapted to the vision of a wearer is obtained starting from a semi-finished lens with the chosen "model design" which is manufactured in large volume, and which has a finished front face. In other words, the front face of the semi-finished lens has local values of average sphere and of cylinder that vary between different points of this face. The rear face, also called back face, of the semi-finished lens is used to adapt the ophthalmic correction to the ametropia of the wearer. For this purpose, it is re-machined according to a prescription established for the wearer. The rear face may comprise a progressive addition surface so as the lens is called a "dual add" PAL.

The semi-finished lens is selected from amongst several standard models (based on the "model design") as a function of a curvature value of the front face at the distance-vision point and from an addition value. Depending on these values, the front face of a progressive semi-finished lens has fixed design features values, which are also called standard designs features values. They are determined for average conditions of use of the lens and are fixed when the semi-finished lens is molded.

The principal standard design features are selected in the list consisting of the standard size parameters of the different vision zones of the progressive addition lens (such as for example the near vision zone, the intermediate vision zone, the distance vision zone), standard inset of a wearer, standard frame design parameters, standard viewing preferences.

In a standard progressive addition lens the size of the distance vision zone is greater than the size of the near vision zone, which is greater than the size of the intermediate zone.

In a progressive addition lens, the near-vision point can be shifted horizontally with respect to a vertical line passing through the distance-vision point, when the lens is in a position of use by its wearer. This shift, which is in the direction of the nasal side of the lens, is usually referred to as "inset". It depends on the optical power of the lens, on the distance of observation of an object, on the prismatic deviation of the lens and on the eye-lens distance, notably. FIG. 1a indicates the positions of the distance-vision and near-vision points of an ophthalmic lens 100, respectively denoted VL and VP, the mounting cross, denoted CM, the meridian line, denoted LM, and the inset, denoted In. FIG. 1b is a profile view of the lens 100, showing the front face of the latter, which is convex and referenced S0, and its concave rear face S1.

Now, it is also known for some design features of a progressive addition lens to be adapted according to the wearer for whom the lens is designed, in particular in order to reduce the time that could be required for the wearer to become accustomed to this progressive addition lens. Such an adaptation of the lens is referred to as 'customization' of the design feature.

As for an example where the design feature parameter is the inset, this can be achieved by simply rotating the semi-finished lens about its optical axis, before the rear face has been adjusted to the prescription and before the lens is cut to the dimensions of a frame of a pair of glasses. The inset value can thus be customized, by means of the angle of rotation, as a function of the measurements made on the wearer. But then all the characteristics of the lens, including the variations in astigmatism outside of the distance-vision and near-vision regions, are simultaneously rotated. This results notably in a reduction in the width of the distance-vision region, measured in a horizontal direction, which may be detrimental to the comfort of the wearer.

There is thus, now a trend to customize progressive addition lenses to the wearer's eyes specificities, in particular to customize the inset.

The inset is usually calculated according to the average sphere in the near vision zone and the reading distance of the wearer.

Although these parameters may give a rough approximation of the inset, there is a need to improve the calculated value of the inset.

One goal of the present invention therefore consists in providing a method for adjusting the value of the inset of a progressive addition lens according to a wearer and that is more accurate than the known methods.

SUMMARY OF THE INVENTION

For this purpose, one subject of the invention is a method implemented by computer means, for determining the value of the inset of a progressive addition lens to be placed in front of a wearer's eye in a given spectacle frame comprising the steps of:

providing convergence data, determining from the convergence data the inset of the progressive addition lens considering at least the convergence data, the prismatic effect of the progressive addition lens and at least one criteria in the list consisting of:

the monocular pupillary distance of the wearer's eye in far (EP) vision, the distance (CC) between the center of rotation and the cornea of the wearer's eye, the distance (DVO_MES) between the cornea of the wearer's eye and the plan defined for the measurement of the monocular pupillary distance, the distance (DVO) between the cornea of the wearer's eye and the lens at the level of the fitting cross of the progressive addition lens when the wearer is wearing the lens in the given spectacle frame, and the thickness (e) of the progressive addition lens at the prism reference point (PRP).

The method according to the invention adjusts the inset taking into consideration not only the convergence of the wearer but also the prismatic effect of the progressive addition lens, therefore increasing the accuracy of the inset.

According to further embodiments of the present invention, which can be considered alone or in combination:

the right inset ($I^r$) of the right progressive addition lens and/or the left inset ($I^l$) of the left progressive addition lens are determined by:

$$I^r = \left\{ \frac{EP^r - \Delta S}{1 + \frac{W^r}{f(CC^r, DVO^r, e^r, LP^r, T^r)} - W^r \cdot g(n^r, B^r_{1.53}, P^r_X)} + C \right\} \cdot \cos(G^r),$$

$$I^l = \left\{ \frac{EP^l - \Delta S}{1 + \frac{W^l}{f(CC^l, DVO^l, e^l, LP^l, T^l)} - W^l \cdot g(n^l, B^l_{1.53}, P^l_X)} + C \right\} \cdot \cos(G^l)$$

where
$EP^r$ and $EP^l$ are the monocular pupillary distance of right and left eyes of the wearer in far vision, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l, \text{ with}$$

$\Delta EP^l$ and $\Delta EP^r$ the monocular pupillary convergence of the left and right eyes, $CC^l$ and $CC^r$ the distance between the center of rotation and the cornea for the left and right eyes, $DVO\_MES^l$ and $DVO\_MES^r$ the distances between the cornea and the plan defined for the measurement of the monocular pupillary distance for the left and right eyes, $DVO^l$ the distance between the cornea of the left eye and the progressive addition lens at the level of the fitting cross of the progressive addition lens when the wearer is wearing the left lens in the given spectacle frame, $DVO^r$ the distance between the cornea of the right eye and the progressive addition lens at the level of the fitting cross of the progressive addition lens when the wearer is wearing the right lens in the given spectacle frame, and $e^l$ and $e^r$ the thickness of the left and right progressive addition lenses at the prism reference point (PRP), f is for each of the left and right eyes and lenses a function of:
the distance ($CC^l$, $CC^r$) between the center of rotation and the cornea of the eye, the distance ($DVO^l$, $DVO^r$) between the cornea of the eye and the lens at the level of the fitting cross of the progressive addition lens when the wearer is wearing the lens in the given spectacle frame, the thickness ($e^l$, $e^r$) of the lens at the prism reference point (PRP), the progression length ($LP^l$, $LP^r$) of the progressive addition lens, the pantoscopic angle ($T^l$, $T^r$) of the chosen spectacle frame, g is for each of the left and right eyes and lenses a function of:
the value of the base ($B_{1.53}^l$, $B_{1.53}^r$) of the front face of the progressive addition lens expressed in diopter using an indice of 1.53,
the index ($n^l$, $n^r$) of the progressive addition lens, and
PX=SPH+CYL.sin$^2$(AXE)+ADD, with SPH, CYL, AXE and ADD respectively the sphere, the cylinder, the axe and the addition of the wearer prescription;

C is a parameter, its value is comprised between −0.5 and −0.05; and $G^l$ and $G^r$ represent the wrap angle of the left and right frames of the chosen spectacle frame;

the inset (I) of the progressive addition lens is determined for a wearer's eye by having all the values of the parameters of the right and left side equal to the values of the parameters of the wearer's eye side, and as a consequence:

$$I = \left\{ \frac{EP}{1 + \frac{W}{f(CC, DVO, e, LP, T)} - W \cdot g(n, B_{1.53}, P_X)} + C \right\} \cdot \cos(G)$$

Where
EP is the monocular pupillary distance of the wearer's eye in far vision, $$W = \frac{EP \cdot (CC + DVO\_MES)}{\Delta EP} - CC - DVO - e,$$

with
$\Delta EP$ the monocular pupillary convergence of the wearer's eye,
CC the distance between the center of rotation of the eye and the cornea of the wearer's eye,
DVO_MES the distance between the cornea of the wearer's eye and the plan defined for the measurement of the monocular pupillary distances,
DVO the distance between the cornea of the wearer's eye and the progressive addition lens at the level of the fitting cross of the progressive addition lens when the wearer is wearing the progressive addition lens in the given spectacle frame, and e the thickness of the progressive addition lens at the prism reference point (PRP), f is a function of
the distance (CC) between the centre of rotation and the cornea of the wearer's eye,
the distance (DVO) between the cornea of the wearer's eye and the progressive addition lens at the level of the fitting cross of the progressive addition lens when the wearer is wearing the progressive addition lens in the given spectacle frame, the thickness (e) of the lens at the prism reference point (PRP),
the length of progression (LP) of the progressive addition lens,
the pantoscopic angle (T) of the chosen spectacle frame, g is a function of
the value of the base ($B_{1.53}$) of the front face of the lens expressed in diopter using an indice of 1.53,
the index (n) of the progressive addition lens, and
PX=SPH+CYL.sin$^2$(AXE)+ADD, with SPH, CYL, AXE and ADD respectively the sphere, the cylinder, the axe and the addition of the wearer prescription;

C is a parameter, its value is comprised between −0.5 and −0.05; and

G represents the wrap angle of the chosen spectacle frame;

$$g = P_X \times \frac{g_1 \cdot (1 + B_{1.53} \cdot P_X \times g_2)}{(n-1)},$$

With $3E^{-4} \leq g1 \leq 9E^{-4}$ and, $-4E^{-3} \leq g2 \leq 1E^{-3}$, $$f = [((CC + DVO) - LP \cdot \sin(T))^2 + (LP \cdot \cos(T))^2]^{\frac{1}{2}} + f_1 \cdot e$$

With $0.5 \leq f_1 \leq 1.5$, $$f = [((CC + DVO) + f_1 \cdot e - LP \cdot \sin(T))^2 + (LP \cdot \cos(T))^2]^{\frac{1}{2}}$$

With $0.5 \leq f1 \leq 1.5$, the right inset ($I^r$) of the right progressive addition lens and/or the left inset ($I^l$) of the left progressive addition lens are determined by:

$$I^r = \left\{ \frac{EP^r - \Delta S}{1 + \frac{W^r}{f(CC^r, DVO^r, e^r, LP^r, T^r, n^r, Y_{VP}^r, P_y^r)} - W^r \cdot g(n^r, B_{1.53}^r, P_x^r)} + C \right\} \cdot \cos(G^r),$$

$$I^l = \left\{ \frac{EP^l + \Delta S}{1 + \frac{W^l}{f(CC^l, DVO^l, e^l, LP^l, T^l, n^l, Y_{VP}^l, P_y^l)} - W^l \cdot g(n^l, B_{1.53}^l, P_x^l)} + C \right\} \cdot \cos(G^l)$$

Where
$EP^r$ and $EP^l$ are the monocular pupillary distance of right and left eyes of the wearer in far vision, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

-continued $$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l,$$

where
  $\Delta EP^l$ and $\Delta EP^r$ the monocular pupillary convergence of the left and right eyes,
  $CC^l$ and $CC^r$ the distance between the center of rotation of the eye and the cornea for the left and right eyes,
  $DVO\_MES^l$ and $DVO\_MES^r$ the distances between the cornea and the plan defined for the measurement of the monocular pupillary distance for the left and right eyes,
  $DVO^l$ the distance between the cornea of the left eye and the progressive addition lens at the level of the fitting cross of the progressive addition lens when the wearer is wearing the left progressive addition lens in the given spectacle frame,
  $DVO^r$ the distance between the cornea of the right eye and the progressive addition lens at the level of the fitting cross of the progressive addition lens when the wearer is wearing the right progressive addition lens in the given spectacle frame, and
  $e^l$ and $e^r$ the thickness of the left and right progressive addition lens at the prism reference point (PRP),
f is for each of the left and right eyes and lenses a function of:
  the distance ($CC^l$, $CC^r$) between the center of rotation of the eye and the cornea,
  the distance ($DVO^l$, $DVO^r$) between the cornea and the lens at the level of the fitting cross of the progressive addition lens when the wearer is wearing the progressive addition lens in the given spectacle frame,
  the thickness ($e^l$, $e^r$) of the lens at the prism reference point (PRP),
  the progression length ($LP^l$, $LP^r$) of the progressive addition lens,
  the pantoscopic angle ($T^l$, $T^r$) of the chosen spectacle frame,
  the vertical position ($YNV^l$, $YNV^r$) of the near vision point of the left and right progressive addition lens relative to the prism reference point (PRP), and
  Py=SPH+CYL.$\cos^2$(AXE)+ADD, with SPH, CYL, AXE and ADD respectively the sphere, the cylinder, the axe and the addition of the wearer prescription;
g is for each of the left and right eyes and lenses a function of
  the value of the base ($B_{1.53}^l$, $B_{1.53}^r$) of the front face of the progressive addition lens expressed in diopter using an indice of 1.53,
  the index ($n^l$, $n^r$) of the progressive addition lens, and
  PX=SPH+CYL.$\sin^2$(AXE)+ADD, with SPH, CYL, AXE and ADD respectively the sphere, the cylinder, the axe and the addition of the wearer prescription;
C is a parameter, its value is comprised between −0.5 and −0.05; and
$G^l$ and $G^r$ represent the wrap angle of the left and right frames of the chosen spectacle frame;

the inset (I) of the progressive addition lens is determined for a wearer's eye by having all the values of the parameters of the right and left side equal to the values of the parameters of the wearer's eye side, and as a consequence:

$$I = \left\{ \frac{EP}{1 + \frac{W}{f(CC, DVO, e, LP, T, n, Y_{VP}, P_y)} - W \cdot g(n, B_{1.53}, P_X)} + C \right\} \cdot \cos(G)$$

Where
EP is the monocular pupillary distance of the wearer's eye in far vision, $$W = \frac{EP \cdot (CC + DVO\_MES)}{\Delta EP} - CC - DVO - e,$$

with
  EP the monocular pupillary distance of the wearer's eye in far (EP) vision,
  $\Delta EP$ the monocular pupillary convergence,
  CC the distance between the center of rotation and the cornea of the wearer's eye,
  DVO_MES the distance between the cornea of the wearer's eye and the plane defined for the measurement of the monocular pupillary distance, and
  DVO the distance between the cornea of the wearer's eye and the progressive addition lens at the level of the fitting cross when the wearer is wearing the progressive addition lens in the given spectacle frame, and
  e the thickness of the progressive addition lens at the prism reference point (PRP),
f is a function of
  the distance (CC) between the center of rotation and the cornea of the wearer's eye,
  the distance (DVO) between the cornea of the wearer's eye and the progressive addition lens at the level of the fitting cross when the wearer is wearing the progressive addition lens in the given spectacle frame,
  the thickness (e) of the lens at the prism reference point (PRP),
  the length of progression (LP) of the progressive addition lens,
  the pantoscopic angle (T) of the chosen spectacle frame,
  the index n of the progressive addition lens,
  the vertical position YNV of the near vision point of the progressive addition lens relative to the prism reference point (PRP), and
  Py=SPH+CYL.$\cos^2$(AXE)+ADD, with SPH, CYL, AXE and ADD respectively the sphere, the cylinder, the axe and the addition of the wearer prescription;
g is a function of
  the value of the base ($B_{1.53}$) of the front face of the lens expressed in diopter using an indice of 1.53,
  the index (n) of the progressive addition lens, and
  PX=SPH+CYL.$\sin^2$(AXE)+ADD, with SPH, CYL, AXE and ADD respectively the sphere, the cylinder, the axe and the addition of the wearer prescription;

C is a parameter, its value is comprised between −0.5 and −0.05; and
G represents the wrap angle of the chosen spectacle frame;

$$g = P_X \times \frac{g_1 \cdot (1 + B_{1.53} \cdot P_X \times g_2)}{(n-1)},$$

With $$3E^{-4} \le g1 \le 9E^{-4} \text{ and,}$$

$$-4E^{-3} \le g2 \le -1E^{-3};$$

$$f = [((CC + DVO) - LP \cdot \sin(T))^2 + (LP \cdot \cos(T))^2]^{\frac{1}{2}} + f_1 \cdot e + f_2 \cdot \frac{(Y_{VP})^2}{(n-1)} P_Y$$

With $$0.5 \le f1 \le 1.5, \text{ and}$$

$$-3.E^{-3} \le f2 \le -0.5E^{-3};$$

$$f = \left[\left((CC + DVO) + f_1 \cdot e + f_2 \cdot \frac{(Y_{VP})^2}{(n-1)} P_Y - LP \cdot \sin(T)\right)^2 + (LP \cdot \cos(T))^2\right]^{\frac{1}{2}}$$

With $$0.5 \le f1 \le 1.5, \text{ and}$$

$$-3.E^{-3} \le f2 \le -0.5E^{-3};$$

the right inset ($I^r$) of the right progressive addition lens and/or the left inset ($I^l$) of the left progressive addition lens are determined by:

$$I^r = \frac{EP^r - \Delta S}{1 + \frac{W^r}{CC^r + DVO^r} - W^r \cdot P^r},$$

$$I^l = \frac{EP^l + \Delta S}{1 + \frac{W^l}{CC^l + DVO^l} - W^l \cdot P^l}$$

where
$EP^r$ and $EP^l$ are the monocular pupillary distance of right and left eyes of the wearer in far vision,
$P^r$ and $P^l$ are the average power in the near vision zone of the right and left progressive addition lens, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^l}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l,$$

with
$\Delta EP^l$ and $\Delta EP^r$ the monocular pupillary convergence of the left and right eyes,
$CC^l$ and $CC^r$ the distance between the centre of rotation of the eye and the cornea for the left and right eyes,
$DVO\_MES^l$ and $DVO\_MES^r$ the distances between the cornea and the plan defined for the measurement of the monocular pupillary distances for the left and right eyes,
$DVO^l$ the distance between the cornea of the left eye and the progressive addition lens at the level of the fitting cross of the progressive addition lens when the wearer is wearing the left lens in the given spectacle frame,
$DVO^r$ the distance between the cornea of the right eye and the progressive addition lens at the level of the fitting cross of the progressive addition lens when the wearer is wearing the right lens in the given spectacle frame, and
$e^l$ and $e^r$ the thickness of the left and right progressive addition lens at the prism reference point (PRP);
the inset of the lens is determined for a wearer's eye by having all the values of the parameters of the right and left side equal to the values of the parameters of the wearer's eye side, and as a consequence:

$$I = \frac{EP}{1 + \frac{W}{CC + DVO} - W \cdot P}$$

where
EP is the monocular pupillary distance of the wearer's eye in far vision,
P is the average power in the near vision zone of the progressive addition lens, and $$W = \frac{EP \cdot (CC + DVO\_MES)}{\Delta EP} - CC - DVO - e,$$

with
$\Delta EP$ the monocular pupillary convergence,
CC the distance between the centre of rotation and the cornea of the wearer's eye,
DVO_MES the distance between the cornea of the wearer's eye and the plan defined for the measurement of the monocular pupillary distance,
DVO the distance between the cornea of the wearer's eye and the progressive addition lens at the level of the fitting cross when the wearer is wearing the lens in the given spectacle frame, and
e the thickness of the progressive addition lens at the prism reference point (PRP);
the monocular pupillary distance of the wearer's eye in far vision and/or the convergence data may be measured.

According to an embodiment, the invention may relate to a method for determining the value of the inset of a progressive addition lens according to a wearer comprising the steps of:
  providing measured convergence data,
  determining from the measured convergence data the inset of the progressive addition lens considering at least the measured convergence data and the prismatic effect of the progressive addition lens.

According to further embodiments of the present invention, which can be considered alone or in combination:
  the method further comprises the steps of:
    providing wearer data comprising at least the wearer's prescription,
    determining the design and optical parameters of the progressive addition lens according to the wearer data,
    and wherein the inset of the progressive addition lens is determined by a ray tracing method.
  the inset of the progressive addition lens is determined by:

$$I = \left\{ \frac{EP}{1 + \frac{W}{f(CC, DVO, e, LP, T)} - W \cdot g(n, B_{1.53}, P_X)} + C \right\} \cdot \cos(G)$$

Where
EP is the measured monocular pupillary distance of the wearer in far vision, $$W = \frac{EP \cdot (CC + DVO\_MES)}{\Delta EP} - CC - DVO - e,$$

with
  EP the measured monocular pupillary distance of the wearer in far (EP) vision
  $\Delta EP$ the measured monocular pupillary convergence
  CC the distance between the centre of rotation of the eye and the cornea,
  DVO_MES the distance between the cornea and the plan of measurement of the monocular pupillary distances,
  DVO the distance between the cornea and the fitting cross of the progressive addition lens when the wearer is wearing the lens, and
  e the thickness of the progressive addition lens at the prism reference point (PRP),
f is a function of
  the distance (CC) between the centre of rotation of the eye and the cornea,
  the distance (DVO) between the cornea and the progressive addition lens at the lens of the fitting cross when the wearer is wearing the lens,
  the thickness (e) of the lens at the prism reference point (PRP),
  the length of progression (LP) of the progressive addition lens,
  the pantoscopic angle (T) of the chosen spectacle frame,
g is a function of
  the value of the base ($B_{1.53}$) of the front face of the lens expressed in diopter using an index of 1.53,
  the index (n) of the progressive addition lens, and
  $PX = SPH + CYL \cdot \sin^2(AXE) + ADD$, with SPH, CYL, AXE and ADD respectively the sphere, the cylinder, the axe and the addition of the wearer prescription;

C is a parameter, its value is comprised between $-0.5$ and $-0.05$; and
G represents the wrap angle of the chosen spectacle frame.

$$g = P_X \times \frac{g_1 \cdot (1 + B_{1.53} \cdot P_X \times g_2)}{(n-1)},$$

With $3E^{-4} \leq g1 \leq 9E^{-4}$ and, $-4E^{-3} \leq g2 \leq -1E^{-3}$;

$$f = [((CC + DVO) - LP \cdot \sin(T))^2 + (LP \cdot \cos(T))^2]^{\frac{1}{2}} + f_1 \cdot e$$

With $0.5 \leq f_1 \leq 1.5$;

$$f = [((CC + DVO) + f_1 \cdot e - LP \cdot \sin(T))^2 + (LP \cdot \cos(T))^2]^{\frac{1}{2}}$$

With $0.5 \leq f1 \leq 1.5$;

the inset of the progressive addition lens is determined by:

$$I = \left\{ \frac{EP}{1 + \frac{W}{f(CC, DVO, e, LP, T, n, Y_{VP}, P_y)} - W \cdot g(n, B_{1.53}, P_X)} + C \right\} \cdot \cos(G)$$

Where
EP is the measured monocular pupillary distance of the wearer in far vision, $$W = \frac{EP \cdot (CC + DVO\_MES)}{\Delta EP} - CC - DVO - e,$$

with
  EP the measured monocular pupillary distance of the wearer in far (EP) vision,
  $\Delta EP$ the measured monocular pupillary convergence,
  CC the distance between the centre of rotation of the eye and the cornea,
  DVO_MES the distance between the cornea and the plane of measurement of the monocular pupillary distances, and
  DVO the distance between the cornea and the progressive addition lens at the level of the fitting cross when the wearer is wearing the lens, and
  e the thickness of the progressive addition lens at the prism reference point (PRP), f is a function of
- the distance (CC) between the centre of rotation of the eye and the cornea,
- the distance (DVO) between the cornea and the progressive addition lens at the level of the fitting cross when the wearer is wearing the lens,
- the thickness (e) of the lens at the prism reference point (PRP),
- the length of progression (LP) of the progressive addition lens,
- the pantoscopic angle (T) of the chosen spectacle frame,
- the index n of the progressive addition lens,
- the vertical position YNV of the near vision point of the progressive addition lens relative to the prism reference point (PRP), and
- Py=SPH+CYL.$\cos^2$(AXE)+ADD, with SPH, CYL, AXE and ADD respectively the sphere, the cylinder, the axe and the addition of the wearer prescription;

g is a function of
- the value of the base ($B_{1.53}$) of the front face of the lens expressed in diopter using an indice of 1.53,
- the index (n) of the progressive addition lens, and
- PX=SPH+CYL.$\sin^2$(AXE)+ADD, with SPH, CYL, AXE and ADD respectively the sphere, the cylinder, the axe and the addition of the wearer prescription;

C is a parameter, its value is comprised between −0.5 and −0.05; and

G represents the wrap angle of the chosen spectacle frame.

$$g = P_X \times \frac{g_1 \cdot (1 + B_{1.53} \cdot P_X \times g_2)}{(n-1)},$$

With $3E^{-4} \leq g1 \leq 9E^{-4}$ and, $-4E^{-3} \leq g2 \leq 1E^{-3}$;

$$f = [((CC + DVO) - LP \cdot \sin(T))^2 + (LP \cdot \cos(T))^2]^{\frac{1}{2}} + f_1 \cdot e + f_2 \cdot \frac{(Y_{VP})^2}{(n-1)} P_Y$$

With $0.5 \leq f1 \leq 1.5$, and $-3.E^{-3} \leq f2 \leq -0.5E^{-3}$;

$$f = \left[\left((CC + DVO) + f_1 \cdot e + f_2 \cdot \frac{(Y_{VP})^2}{(n-1)} P_Y - LP \cdot \sin(T)\right)^2 + (LP \cdot \cos(T))^2\right]^{\frac{1}{2}}$$

With $0.5 \leq f1 \leq 1.5$, and $-3.E^{-3} \leq f2 \leq -0.5E^{-3}$.

the inset of the progressive addition lens is determined by:

$$I = \frac{EP}{1 + \frac{W}{CC + DVO} - W \cdot P}$$

Where

EP is the measured monocular pupillary distance of the wearer in far vision,

P is the average power in the near vision zone of the progressive addition lens, and $$W = \frac{EP \cdot (CC + DVO\_MES)}{\Delta EP} - CC - DVO - e,$$

with
- EP the measured monocular pupillary distance of the wearer in far (EP) vision
- ΔEP the measured monocular pupillary convergence,
- CC the distance between the centre of rotation of the eye and the cornea,
- DVO_MES the distance between the cornea and the plan of measurement of the monocular pupillary distances,
- DVO the distance between the cornea and the progressive addition lens at the level of the fitting cross when the wearer is wearing the lens, and
- e the thickness of the progressive addition lens at the prism reference point (PRP).

The invention relates also to an ophthalmic lens, for example progressive addition lens, design method comprising the steps of:
- providing an order request comprising at least the wearer prescription,
- determining the design and optical parameters of at least one progressive addition lens according to the wearer data,
- determining the value of the inset of the at least on progressive addition lens according to a method of the invention.

The invention also relates to an ophthalmic lens, for example progressive addition lens, manufacturing method comprising the steps of:
- providing an order request comprising at least the wearer prescription,
- determining the design and optical parameters of at least one progressive addition lens according to the wearer data,
- determining the value of the inset of the at least one progressive addition lens according to a method of the invention,
- manufacturing the at least one progressive addition lens having the adjusted inset and the calculated design and optical parameters.

The present invention further relates to a method of ordering a progressive addition lens comprising the step of
- determining the monocular pupillary distance in far vision,
- sending an order request for at least one progressive addition lens comprising at least the wearer data and the monocular papillary distance, and
- receiving the at least one progressive addition lens, wherein the inset of the progressive addition lens is adjusted according to a method of the invention.

The invention also relates to a computer program product comprising one or more stored sequence of instruction that is accessible to a processor and which, when executed by the processor, causes the processor to carry out the steps of a method according to the invention.

The invention further relates to a computer readable medium carrying one or more sequences of instructions of the computer program product of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other features and advantages of the present invention will become apparent in the description herein below of non-limiting exemplary embodiments, making reference to the appended drawings, in which.

DETAILED DESCRIPTION

Usually, a person needing to wear spectacles and having thus a prescription filled by an ophthalmologist or by another authorized eye care professional goes to the premise of an optician for choosing the frame of the future spectacles. The future wearer of the spectacles may try several spectacle frames and finally chooses one of the tried frames.

The optician may help the wearer to select a frame for example which fits properly the wearer's face, that is stable on the nose and offers sufficient height between the pupil and the lower rim of the frame.

The optician may then perform measurements on the spectacle frame the wearer as chosen. According to different embodiment of the invention, the optician may provide measurement data of the chosen frame.

For example, the optician may evaluate for the right and/or left eyes the distance DVO between the cornea of the wearer's right or left eye and the progressive addition lens at the level of the fitting cross when the wearer is wearing the progressive addition lens. Such evaluation may be done by associating a 3D representation of the wearer's face, the spectacle frame and the progressive addition lens. Such evaluation may be done by measuring the distance between the cornea of the wearer and the presentation lens when the wearer is wearing the spectacle frame with a presentation lens.

Figure 1A:
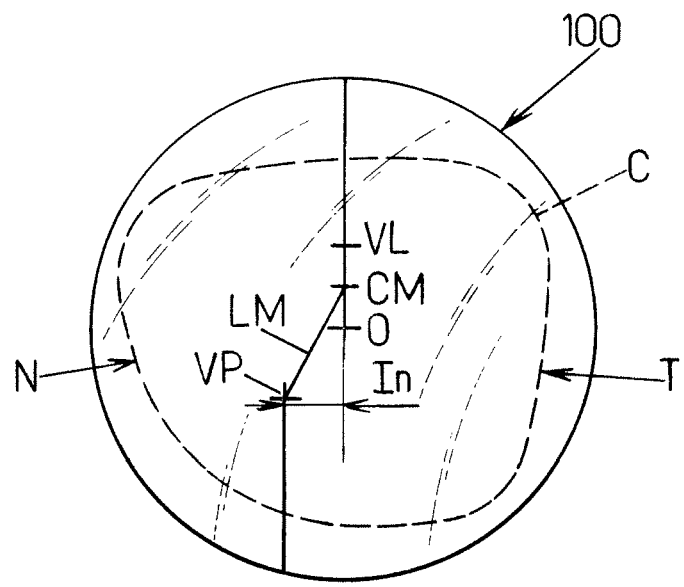
FIGS. 1a and 1b are plan and profile views, respectively, of an ophthalmic progressive addition lens, which indicates certain geometrical or optical data on this lens.
Figure 1B:
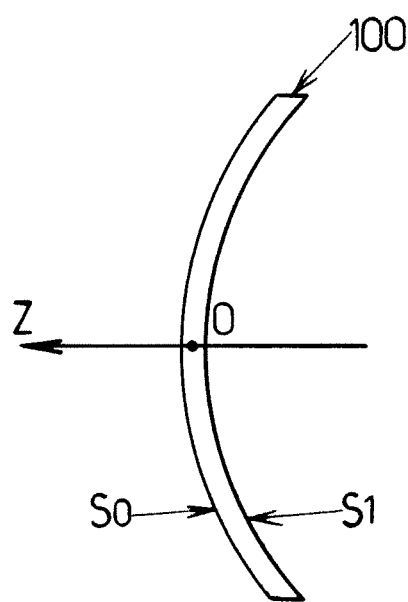
Figure 2:
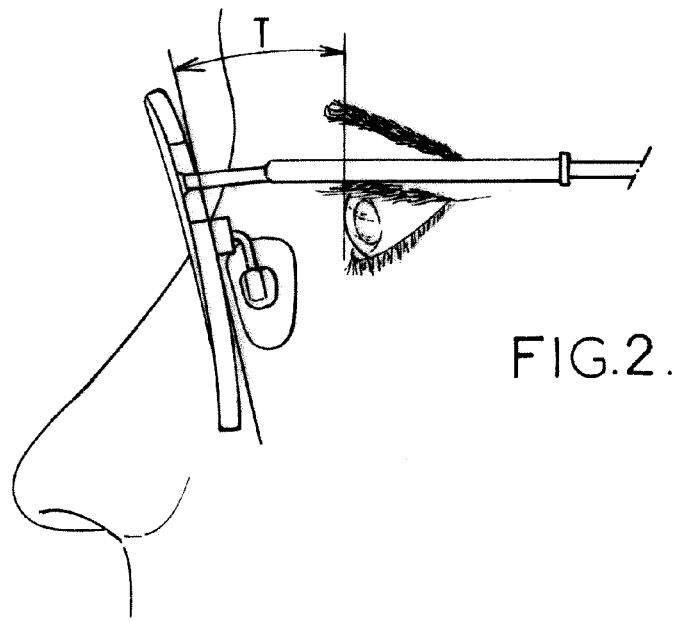
FIG. 2 illustrates the profile of a wearer wearing a spectacle frame.

The optician may also determine, for example measure, the pantoscopic angle T of the chosen spectacle frame. As illustrated on FIG. 2, the pantoscopic angle T corresponds to the angle between the direction of the front face of the frame and the vertical direction when the wearer is wearing the frame.

The optician may either measure directly the pantoscopic angle T on the chosen spectacle frame or may find a value of said angle in a database.

Figure 3:
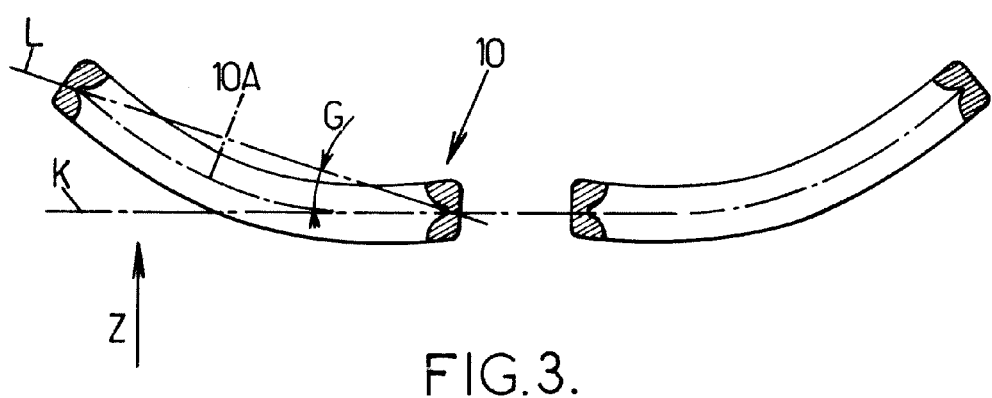
FIG. 3 is a side view of a spectacle frame.

The optician may further determine the wrap angle G of the chosen spectacle frame. As illustrated on FIG. 3, the wrap angle G of a spectacle frame corresponds at the angle between the general plan K of the frame 10 and the axis L defined as the axis through two opposite points of the groove 10A and which presents the greatest inclination compared to the general plan K of the frame.

The optician may either measure the wrap angle directly on the chosen spectacle frame or obtain the value of said angle using a database.

According to the invention, the optician may also provide wearer data comprising parameters related to the wearer.

The optician may measure the pupillary distance of the wearer in distance vision and in near vision. Currently, progressive addition lens are centered in far vision by placing the distance vision fitting cross of the progressive addition lens in accordance with the monocular pupillary distance of the wearer in distance vision and usually, the position of the near vision zone corresponds to a mean value of convergence and not to the real convergence of the wearer.

The present invention has the advantage of taking into account of the monocular convergence of one or both eyes of the subject to determine the position of the near vision zone of the progressive addition lens. The real monocular convergence of one or both eyes of the subject can differ in value from a mean or theoretical inset in several cases, for example in convergence insufficiency and/or asymmetrical monocular convergences due to the individual head position regarding a near vision material.

According to an embodiment of the invention, the optician may determine the pupillary distance of the wearer by using a data base or by taking an average value.

According to the invention, the optician may measure pupillary distance using any known techniques, such as using a corneal reflection pupillometer or the "method of the mirror". Methods like the "method of the mirror" have the advantage of letting the subject adopt a quite natural behavior during the measurement. The optician may then calculate from the measure pupillary distance the monocular convergence of the wearer.

Advantageously the "method of the mirror" allows measuring the convergence of the wearer in the reading position. The wording "a reading position" is widely used for a man skilled in the art of vision correction and has to be understood as a reading position where the object to be read is situated between 25 to 50 cm from the eye or more generally from spectacles plan of the reader (see for example: "Le nouveau Dictionnaire de la vision"—Michel Millodot—Médiacom Vision Editeur). An example of a "method of the mirror" is described in pages 68 and 69 of "La tête et ses mesures", Claude Darras, Edition: Centre de Protection Oculaire, 45 rue de Lancry, 75010 Paris.

According to different embodiments of the invention, the optician may also determine, for the right and/or left eye of the wearer, the distance CC between the center of rotation of the left and/or right eye of the wearer and the cornea of the left and/or right eye of the wearer. The optician may either measure directly this distance on the wearer or obtain a default value from a database.

According embodiments of the invention, the optician may also determine for the right and/or left eyes of the wearer the distance DVO_MES between the cornea of the right and/or left eye and the plan defined for the measurement of the monocular pupillary distance. Such distance may correspond to the distance between the cornea of the right and/or left eye of the wearer and the rear face of the lens, used in the so called "mirror method" or correspond to a value specific to the corneal reflection pupillometer used by the optician.

According to the invention, an order request is provided, for example to the lens provider or designer. The order request may for example be received by the lens provider or designer. For example, after having determined the required data, for example after having performed the required measurements, the optician sends an order request to a lens provider or designer.

According to an embodiment of the invention, the order request may comprise the measured convergence data, wearer data and data related to the spectacle frame.

For example, the optician may provide the measured EP monocular pupillary distance of the wearer in far vision, the measured monocular pupillary convergence ΔEP, the distance CC between the center of rotation of the right and/or left eye of the wearer and the right and/or left cornea, the distance DVO_MES between the cornea of the right and/or left eye and the plan defined for the measurement of the monocular pupillary distance for the right and/or left eye, the distance DVO between the cornea of the right and/or left eye and the fitting cross of the progressive addition lens at the level of the fitting cross when the wearer is wearing the lens, the pantoscopic angle T of the chosen spectacle frame, and the wrap angle G of the chosen spectacle frame and the wearer's prescription.

According to an embodiment of the invention, the lens designer receives the order request and determines an ophthalmic progressive addition lens design and manufacturing parameters corresponding to the order request.

According to the invention the lens provider may determine from the measured convergence data the inset of the progressive addition lens to be used for a given eye of the wearer considering at least the measured convergence data and the prismatic effect of the progressive addition lens and at least one criterion in the list consisting of:

the monocular pupillary distance of the wearer's eye in far (EP) vision,
the distance (CC) between the centre of rotation and the cornea of the wearer's eye,
the distance (DVO_MES) between the cornea of the wearer's eye and the plan defined for the measurement of the monocular pupillary distance,
the distance (DVO) between the cornea of the wearer's eye and the lens at the level of the fitting cross of the progressive addition lens when the wearer is wearing the lens in the given spectacle frame, and
the thickness (e) of the progressive addition lens at the prism reference point (PRP), each distance being determined for the side of the given eye of the wearer.

According to an embodiment of the invention, the lens designer may use the wearer data, for example the wearer prescription, to determine the design and optical parameters of the progressive addition lens.

The lens designer may then determine the inset of the progressive addition lens using the method of ray tracing. Such method consist in using a virtual representation of the progressive addition lens and tracing the rays from the eye through the progressive addition lens and thereby determining the inset of the progressive addition lens considering the prismatic effect of said lens.

According to different embodiments of the invention, the lens designer may determine the right inset ($I^r$) of the right progressive addition lens and/or the left inset ($I^l$) of the left progressive addition lens using one of the following equations:

$$I^r = \left\{ \frac{EP^r - \Delta S}{1 + \frac{W^r}{f(CC^r, DVO^r, e^r, LP^r, T^r)} - W^r \cdot g(n^r, B^r_{1.53}, P^r_x)} + C \right\} \cdot \cos(G^r), \quad (1^r)$$

$$I^l = \left\{ \frac{EP^l + \Delta S}{1 + \frac{W^l}{f(CC^l, DVO^l, e^l, LP^l, T^l)} - W^l \cdot g(n^l, B^l_{1.53}, P^l_x)} + C \right\} \cdot \cos(G^l), \quad (1^l)$$

$$I^r = \left\{ \frac{EP^r - \Delta S}{1 + \frac{W^r}{f(CC^r, DVO^r, e^r, LP^r, T^r, n^r, Y^r_{VP}, P^r_y)} - W^r \cdot g(n^r, B^r_{1.53}, P^r_x)} + C \right\} \cdot \cos(G^r), \quad (2^r)$$

$$I^l = \left\{ \frac{EP^l + \Delta S}{1 + \frac{W^l}{f(CC^l, DVO^l, e^l, LP^l, T^l, n^l, Y^l_{VP}, P^l_y)} - W^l \cdot g(n^l, B^l_{1.53}, P^l_x)} + C \right\} \cdot \cos(G^l) \quad (2^l)$$

$$I^r = \frac{EP^r - \Delta S}{1 + \frac{W^r}{CC^r + DVO^r} - W^r \cdot P^r}, \quad (3^r)$$

-continued $$I^l = \frac{EP^l + \Delta S}{1 + \frac{W^l}{CC^l + DVO^l} - W^l \cdot P^l}, \quad (3^l)$$

where
EP$^r$ and EP$^l$ are the monocular pupillary distance of right and left eyes of the wearer in far vision, these distances may be provided by the optician when sending the order request. According to the invention the monocular pupillary distance is the distance between the centre of the wearer pupil and the midline of the bridge of the nose or the spectacle frame when the eye is in the primary position. In the sense of the invention the primary position shall mean the position of the eye relative to the head looking straight ahead at an object at eye level.
P$^r$ and P$^l$ are the average power in the near vision zone of the right and left progressive addition lens. Each power is determined by the lens designer according to the wearer's prescription.
C is a parameter, its value is comprised between −0.5 and −0.05; for example C=−0.138.
G$^l$ and G$^r$ represent the wrap angle of the left and right frames of the chosen spectacle frame, its value is generally comprised between 0 and 25 degrees, for example: 5°.
and where:

$$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l, \text{ with}$$

ΔEP$^l$ and ΔEP$^r$ the monocular pupillary convergence of the left and right eyes, for example provided by the optician,
CC$^l$ and CC$^r$ the distance between the centre of rotation and the cornea for the left and right eyes, said distances may be provided by any means known in the art, for example may be provided by the optician or may be chosen from a database, their values being generally comprised between 11 mm and 15 mm, for example equal to 13.5 mm,
DVO_MES$^l$ and DVO_MES$^r$ the distances between the cornea and the plan defined for the measurement of the monocular pupillary distance for the left and right eyes, said distances may be provided by any means known in the art for example may be provided by the optician or may be determine through a database, their values being generally comprised between 5 mm and 25 mm, for example equal to 12 mm,
DVO$^l$ the distance between the cornea of the left eye and the progressive addition lens at the level of the fitting cross of the progressive addition lens when the wearer is wearing the left lens in the given spectacle frame, its value may be provided by any means known in the art, for example may be provided by the optician or may be determine through a database or determine by the lens designer himself, its value being generally comprised between 5 mm and 25 mm, for example equal to 12 mm,
DVO$^r$ the distance between the cornea of the right eye and the progressive addition lens at the level of the fitting cross of the progressive addition lens when the wearer is wearing the right lens in the given spectacle frame, its value may be provided by any means known in the art, for example may be provided by the optician or may be determine through a database or determine by the lens designer himself, its value being generally comprised between 5 mm and 25 mm, for example equal to 12 mm, and
e$^l$ and e$^r$ the thickness of the left and right progressive addition lenses at the prism reference point (PRP), said thicknesses may be determined by the lens designer,
W$^r$ and W$^l$ represent the distance projected onto the horizontal plane between:
the front face of the right and left lenses respectively and
the intersection point between the visual axis of the right and left eye repetitively during the convergence measurement and the sagittal plane of the wearer. The sagittal plane is defined as the vertical virtual plane going through the middle of the bridge of the nose of the wearer.
According to the embodiment corresponding to equations (1$^r$) and (1$^l$), $$f = [((CC + DVO) - LP \cdot \sin(T))^2 + (LP \cdot \cos(T))^2]^{\frac{1}{2}} + f_1 \cdot e \text{ or}$$

$$f = [((CC + DVO) + f_1 \cdot e - LP \cdot \sin(T))^2 + (LP \cdot \cos(T))^2]^{\frac{1}{2}}$$

With $$0.5 \leq f1 \leq 1.5,$$

for example f1=1.12 and
the distance (CC) between the centre of rotation of the eye and the cornea,
the distance (DVO) between the cornea and the fitting cross of the progressive addition lens when the wearer is wearing the lens,
the thickness (e) of the lens at the prism reference point (PRP),
the length of progression (LP) of the progressive addition lens,
the pantoscopic angle (T) of the chosen spectacle frame, its value being generally comprised between 0° and 25°, for example T=8°, $$g = P_X \times \frac{g_1 \cdot (1 + B_{1.53} \cdot P_X \times g_2)}{(n-1)},$$

with $$3E^{-4} \leq g1 \leq 9E^{-4},$$

for example g1=4.38E$^{-4}$ and, $$-4E^{-3} \leq g2 \leq -1E^{-3},$$

for example g2=−1.7E$^{-3}$ the value of the base ($B_{1.53}$) of the front face of the lens expressed in diopter using an indice of 1.53, the index (n) of the progressive addition lens, and PX=SPH+CYL.sin$^2$(AXE)+ADD, with SPH, CYL, AXE and ADD respectively the sphere, the cylinder, the axe and the addition of the wearer prescription.

According to the embodiment corresponding to equations (1$^r$) and (1$^l$), the prismatic effect of the progressive addition lens is comprised in the expression:

$$g = P_X \times \frac{g_1 \cdot (1 + B_{1.53} \cdot P_X \times g_2)}{(n-1)}.$$

Advantageously, the embodiment corresponding to equations (1$^r$) and (1$^l$), is a good compromise between the number of parameters of the progressive addition lens to be calculated and the accuracy of the inset.

According to the embodiment corresponding to equations (2$^r$) and (2$^l$), $$f = [((CC + DVO) - LP \cdot \sin(T))^2 + (LP \cdot \cos(T))^2]^{1/2} + f_1 \cdot e + f_2 \cdot \frac{(Y_{VP})^2}{(n-1)} P_Y \text{ or}$$

$$f = \left[\left((CC + DVO) + f_1 \cdot e + f_2 \cdot \frac{(Y_{VP})^2}{(n-1)} P_Y - LP \cdot \sin(T)\right)^2 + (LP \cdot \cos(T))^2\right]^{1/2}$$

With $$0.5 \leq f1 \leq 1.5,$$

for example f1=1.13 and $$-3.E^{-3} \leq f2 \leq -0.5E^{-3},$$

for example f2=−1.15E$^{-3}$ the distance (CC) between the centre of rotation of the eye and the cornea, the distance (DVO) between the cornea and the fitting cross of the progressive addition lens when the wearer is wearing the lens, the thickness (e) of the lens at the prism reference point (PRP), the length of progression (LP) of the progressive addition lens, the pantoscopic angle (T) of the chosen spectacle frame, its value is generally comprised between 0 and 25 degrees, for example T=8°, the index n of the progressive addition lens, the vertical position YNV of the near vision point of the progressive addition lens relative to the prism reference point (PRP), and Py=SPH+CYL.cos$^2$(AXE)+ADD, with SPH, CYL, AXE and ADD respectively the sphere, the cylinder, the axe and the addition of the wearer prescription;

$$g = P_X \times \frac{g_1 \cdot (1 + B_{1.53} \cdot P_X \times g_2)}{(n-1)},$$

with $$3E^{-4} \leq g1 \leq 9E^{-4},$$

for example g1=6.2E$^{-4}$ and, $$-4E^{-3} \leq g2 \leq -1E^{-3},$$

for example g2=−2.28E$^{-3}$ the value of the base ($B_{1.53}$) of the front face of the lens expressed in diopter using an indice of 1.53, the index (n) of the progressive addition lens, and PX=SPH+CYL.sin$^2$(AXE)+ADD, with SPH, CYL, AXE and ADD respectively the sphere, the cylinder, the axe and the addition of the wearer prescription.

According to the embodiment corresponding to equations (2$^r$) and (2$^l$), the prismatic effect of the progressive addition lens is comprised in the expression:

$$g = P_X \times \frac{g_1 \cdot (1 + B_{1.53} \cdot P_X \times g_2)}{(n-1)}.$$

Advantageously, the embodiment corresponding to equations (2$^r$) and (2$^l$), is a good compromise between the number of parameters of the progressive addition lens to be calculated and the accuracy of the inset.

According to the embodiment corresponding to equations (3$^r$) and (3$^l$) the prismatic effect of the progressive addition lens is comprised in the expression W.P.

Advantageously, the embodiment corresponding to equations (3$^r$) and (3$^l$), requires very little calculation of the lens parameters.

According to monocular embodiments of the invention, the lens designer may use one of the equations (1$^r$), (1$^l$), (2$^r$) (2$^l$) (3$^r$) or (3$^l$) to determine the inset of a wearer's eye by having all the values of the parameters of the right and left side in equations (1$^r$), (1$^l$), (2$^r$), (2$^l$), (3$^r$) or (3$^l$) equal to the value of the parameters of the wearer's side.

According to a first monocular embodiment of the invention, the lens designer may determine the inset of the progressive addition lens by:

$$I = \frac{EP}{1 + \frac{W}{CC + DVO} - W \cdot P}$$

Where

EP is the measured monocular pupillary distance of the wearer in far vision.

P is the average power in the near vision zone of the progressive addition lens, each power is determined by the lens designer according to the wearer's prescription.

$$W = \frac{EP \cdot (CC + DVO\_MES)}{\Delta EP} - CC - DVO - e,$$

with

EP the measured monocular pupillary distance of the wearer in far vision, for example provided by the optician, according to the invention the monocular pupillary distance is the distance between the centre of the wearer pupil and the midline of the bridge of the nose or the spectacle frame when the eye is in the primary position. In the sense of the invention the primary position shall mean the position of the eye relative to the head looking straight ahead at an object at eye level.

ΔEP the measured monocular pupillary convergence, for example provided by the optician, CC the distance between the centre of rotation of the eye of the wearer and his cornea, said distance may be provided by any means known in the art, for example may be provided by the optician or may be chosen from a database, its value being generally comprised between 11 mm and 15 mm, for example CC=13.5 mm, DVO_MES the distance between the cornea of the wearer and the plan of measurement of the monocular pupillary distances, said distance may be provided by any means known in the art for example may be provided by the optician or may be determine through a database, its value being generally comprised between 5 mm and 25 mm, for example DVO_MES=12 mm, DVO the distance between the cornea of the wearer and the fitting cross of the progressive addition lens when the wearer is wearing the lens, its value may be provided by any means known in the art, for example may be provided by the optician or may be determine through a database or determine by the lens designer himself, its value being generally comprised between 5 mm and 25 mm, for example DVO=12 mm, and e the thickness of the progressive addition lens at the prism reference point, said thickness may be determined by the lens designer.

W represents the distance projected onto the horizontal plane between:

the front face of the lens and the intersection point between the visual axis of the eye during the convergence measurement and the sagittal plane of the wearer. The sagittal plane is defined as the vertical virtual plane going through the middle of the bridge of the nose of the wearer. According to this embodiment the prismatic effect of the progressive addition lens is comprised in the expression W.P.

Advantageously, such embodiment requires very little calculation of the lens parameters.

According to another monocular embodiment of the invention, the lens designer may determine the inset of the progressive addition lens by $$I = \left\{ \frac{EP}{1 + \frac{W}{f(CC, DVO, e, LP, T)} - W \cdot g(n, B_{1.53}, P_X)} + C \right\} \cdot \cos(G)$$

where EP is the measured monocular pupillary distance of the wearer in far vision, $$W = \frac{EP \cdot (CC + DVO\_MES)}{\Delta EP} - CC - DVO - e,$$

with

EP the measured monocular pupillary distance of the wearer in far (EP) vision

ΔEP the measured monocular pupillary convergence

CC the distance between the centre of rotation of the eye and the cornea,

DVO_MES the distance between the cornea and the plan of measurement of the monocular pupillary distances, DVO the distance between the cornea and the fitting cross of the progressive addition lens when the wearer is wearing the lens, and e the thickness of the progressive addition lens at the prism reference point (PRP), $$f = [((CC + DVO) - LP \cdot \sin(T))^2 + (LP \cdot \cos(T))^2]^{1/2} + f_1 \cdot e \text{ or}$$

$$f = [((CC + DVO) + f_1 \cdot e - LP \cdot \sin(T))^2 + (LP \cdot \cos(T))^2]^{1/2}$$

With $0.5 \leq f1 \leq 1.5,$ for example f1=1.12 and the distance (CC) between the centre of rotation of the eye and the cornea, the distance (DVO) between the cornea and the fitting cross of the progressive addition lens when the wearer is wearing the lens, the thickness (e) of the lens at the prism reference point (PRP), the length of progression (LP) of the progressive addition lens, the pantoscopic angle (T) of the chosen spectacle frame, its value being generally comprised between 0° and 25°, for example T=8°, $$g = P_X \times \frac{g_1 \cdot (1 + B_{1.53} \cdot P_X \times g_2)}{(n-1)},$$

with $3E^{-4} \leq g1 \leq 9E^{-4},$ for example g1=4.38E$^{-4}$ and, $-4E^{-3} \leq g2 \leq -1E^{-3},$ for example g2=−1.7E$^{-3}$ the value of the base ($B_{1.53}$) of the front face of the lens expressed in diopter using an indice of 1.53, the index (n) of the progressive addition lens, and PX=SPH+CYL.sin$^2$(AXE)+ADD, with SPH, CYL, AXE and ADD respectively the sphere, the cylinder, the axe and the addition of the wearer prescription;

C is a parameter, its value is comprised between −0.5 and −0.05; for example C=−0.138.

G represents the wrap angle of the chosen spectacle frame, its value is generally comprised between 0 and 25 degrees, for example: 5°.

According to this embodiment the prismatic effect of the progressive addition lens is comprised in the expression $$g = P_X \times \frac{g_1 \cdot (1 + B_{1.53} \cdot P_X \times g_2)}{(n-1)}.$$

Advantageously, such embodiment is a good compromise between the number of parameters of the progressive addition lens to be calculated and the accuracy of the inset.

According to another embodiment of the invention the lens designer may determine the inset of the progressive addition lens by:

$$I = \left\{ \frac{EP}{1 + \frac{W}{f(CC, DVO, e, LP, T, n, Y_{VP}, P_y)} - W \cdot g(n, B_{1.53}, P_X)} + C \right\} \cdot \cos(G)$$

Where $$W = \frac{EP \cdot (CC + DVO\_MES)}{\Delta EP} - CC - DVO - e,$$

with
EP the measured monocular pupillary distance of the wearer in far (EP) vision,
ΔEP the measured monocular pupillary convergence,
CC the distance between the centre of rotation of the eye and the cornea,
DVO_MES the distance between the cornea and the plan of measurement of the monocular pupillary distances,
DVO the distance between the cornea and the fitting cross of the progressive addition lens when the wearer is wearing the lens, and
e the thickness of the progressive addition lens at the prism reference point (PRP), $$f = [((CC + DVO) - LP \cdot \sin(T))^2 + (LP \cdot \cos(T))^2]^{1/2} + f_1 \cdot e + f_2 \cdot \frac{(Y_{VP})^2}{(n-1)} P_Y \text{ or}$$

$$f = \left[ \left( (CC + DVO) + f_1 \cdot e + f_2 \cdot \frac{(Y_{VP})^2}{(n-1)} P_Y - LP \cdot \sin(T) \right)^2 + (LP \cdot \cos(T))^2 \right]^{1/2}$$

With $0.5 \leq f1 \leq 1.5$, for example f1=1.13 and $-3.E^{-3} \leq f2 \leq -0.5E^{-3}$, for example f2=$-1.15E^{-3}$
the distance (CC) between the center of rotation of the eye and the cornea,
the distance (DVO) between the cornea and the fitting cross of the progressive addition lens when the wearer is wearing the lens,
the thickness (e) of the lens at the prism reference point (PRP),
the length of progression (LP) of the progressive addition lens,
the pantoscopic angle (T) of the chosen spectacle frame, its value is generally comprised between 0 and 25 degrees, for example T=8°,
the index n of the progressive addition lens,
the vertical position YNV of the near vision point of the progressive addition lens relative to the prism reference point (PRP), and
Py=SPH+CYL.cos²(AXE)+ADD, with SPH, CYL, AXE and ADD respectively the sphere, the cylinder, the axe and the addition of the wearer prescription;

$$g = P_X \times \frac{g_1 \cdot (1 + B_{1.53} \cdot P_X \times g_2)}{(n-1)},$$

with $3E^{-4} \leq g1 \leq 9E^{-4}$, for example g1=$6.2E^{-4}$ and, $-4E^{-3} \leq g2 \leq -1E^{-3}$, for example g2=$-2.28E^{-3}$
the value of the base ($B_{1.53}$) of the front face of the lens expressed in diopter using an indice of 1.53,
the index (n) of the progressive addition lens, and
PX=SPH+CYL.sin²(AXE)+ADD, with SPH, CYL, AXE and ADD respectively the sphere, the cylinder, the axe and the addition of the wearer prescription;
C is a parameter, its value is comprised between −0.5 and −0.05, for example C=−0.138; and
G represents the wrap angle of the chosen spectacle frame, its value is generally comprised between 0 and 25 degrees, for example G=5°.

According to this embodiment the prismatic effect of the progressive addition lens is comprised in the expression:

$$g = P_X \times \frac{g_1 \cdot (1 + B_{1.53} \cdot P_X \times g_2)}{(n-1)}.$$

Advantageously, such embodiment is a good compromise between the number of parameters of the progressive addition lens to be calculated and the accuracy of the inset.

The invention has been described above with the head of the embodiments without limitation of the general inventive concept. In particular, most of the embodiments of the invention have been described with measured convergence data, measured monocular pupillary convergence, and measured monocular pupillary distance of the wearer in far vision, however, the convergence data, the monocular pupillary convergence, and the monocular pupillary distance of the wearer in far vision may be determined by any method known from the person skilled in the art, for example by taking average values or using a data base.

The invention claimed is:

1. A progressive addition lens manufacturing method, comprising:
providing an order request comprising at least the wearer prescription,
determining the design and optical parameters of at least one progressive addition lens according to the wearer data,
determining the value of the inset of at least one progressive addition lens to be placed before a wearer's eye in a given spectacle frame,
manufacturing at least one progressive addition lens having the determined inset and the calculated design and optical parameters,
wherein the value of the inset of a progressive addition lens is determined using a determination method implemented by computer means, the determination method comprising:

providing convergence data,
determining from the convergence data the inset of the progressive addition lens considering at least the convergence data, the prismatic effect of the progressive addition lens and at least one criteria in the list consisting of:
the monocular pupillary distance of the wearer's eye in far vision,
the distance between the center of rotation and the cornea of the wearer's eye,
the distance between the cornea of the wearer's eye and a plan defined for the measurement of the monocular pupillary distance,
the distance between the cornea of the wearer's eye and the lens at the level of the fitting cross of the progressive addition lens when the wearer is wearing the lens in the given spectacle frame, and
the thickness of the progressive addition lens at the prism reference point, and
wherein the right inset ($I^r$) of a right progressive addition lens and/or the left inset ($I^l$) of a left progressive addition lens are determined by:

$$I^r = \left\{ \frac{EP^r - \Delta S}{1 + \frac{W^r}{f(CC^r, DVO^r, e^r, LP^r, T^r)} - W^r \cdot g(n^r, B^r_{1.53}, P^r_x)} + C \right\} \cdot \cos(G^r),$$

$$I^l = \left\{ \frac{EP^l + \Delta S}{1 + \frac{W^l}{f(CC^l, DVO^l, e^l, LP^l, T^l)} - W^l \cdot g(n^l, B^l_{1.53}, P^l_x)} + C \right\} \cdot \cos(G^l)$$

where $EP^r$ and $EP^l$ are the monocular pupillary distance of right and left eyes of the wearer in far vision, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l,$$

with
$\Delta EP^l$ and $\Delta EP^r$ the monocular pupillary convergence of the left and right eyes,
$CC^l$ and $CC^r$ the distance between the center of rotation and the cornea for the left and right eyes,
$DVO\_MES^l$ and $DVO\_MES^r$ the distances between the cornea and the plan defined for the measurement of the monocular pupillary distance for the left and right eyes,
$DVO^l$ the distance between the cornea of the left eye and the progressive addition lens at the level of the fitting cross of the progressive addition lens when the wearer is wearing the left lens in the given spectacle frame,
$DVO^r$ the distance between the cornea of the right eye and the progressive addition lens at the level of the fitting cross of the progressive addition lens when the wearer is wearing the right lens in the given spectacle frame, and $e^l$ and $e^r$ the thickness of the left and right progressive addition lenses at the prism reference point;
f is, for each of the left and right eyes and lenses, a function of:
the distance between the centre of rotation and the cornea of the eye,
the distance between the cornea of the eye and the lens at the level of the fitting cross of the progressive addition lens when the wearer is wearing the lens in the given spectacle frame,
the thickness $e^l$, $e^r$ of the lens at the prism reference point,
the progression length $LP_l$, $LP^r$ of the progressive addition lens, and
the pantoscopic angle $T^l$, $T^r$ of the chosen spectacle frame;
g is, for each of the left and right eyes and lenses, a function of:
the value of the base $B_{1.53}{}^l$, $B_{1.53}{}^r$ of the front face of the progressive addition lens expressed in diopter using an indice of 1.53,
the index $n^l$, $n^r$ of the progressive addition lens, and
the value of the parameter $P^l_x$, $P^r_x$ that corresponds to the sum $SPH+CYL.\sin^2(AXE)+ADD$, with SPH, CYL, AXE and ADD respectively the sphere, the cylinder, the axe and the addition of the wearer prescription;
C is a parameter, its value is comprised between −0.5 and −0.05; and
$G^l$ and $G^r$ represent the wrap angle of the left and right frames of the chosen spectacle frame.

2. The method according to claim 1, wherein
the inset of the progressive addition lens is determined for a wearer's eye by having all the values of the parameters of the right and left side equal to the values of the parameters of the wearer's eye side, and as a consequence:

$$I = \left\{ \frac{EP}{1 + \frac{W}{f(CC, DVO, e, LP, T)} - W \cdot g(n, B_{1.53}, P_X)} + C \right\} \cdot \cos(G)$$

where
EP is the monocular pupillary distance of the wearer's eye in far vision, $$W = \frac{EP \cdot (CC + DVO\_MES)}{\Delta EP} - CC - DVO - e,$$

with
$\Delta EP$ the monocular pupillary convergence of the wearer's eye,
CC the distance between the center of rotation of the eye and the cornea of the wearer's eye,
DVO_MES the distance between the cornea of the wearer's eye and the plan defined for the measurement of the monocular pupillary distances,
DVO the distance between the cornea of the wearer's eye and the progressive addition lens at the level of the fitting cross of the progressive addition lens when the wearer is wearing the progressive addition lens in the given spectacle frame,
e the thickness of the progressive addition lens at the prism reference point;

f is a function of:
the distance between the center of rotation and the cornea of the wearer's eye,
the distance between the cornea of the wearer's eye and the progressive addition lens at the level of the fitting cross of the progressive addition lens when the wearer is wearing the progressive addition lens in the given spectacle frame,
the thickness e of the lens at the prism reference point,
the length of progression LP of the progressive addition lens, and
the pantoscopic angle T of the chosen spectacle frame;
g is a function of:
the value $B_{1.53}$ of the base of the front face of the lens expressed in diopter using an indice of 1.53,
the index n of the progressive addition lens, and
$P_X$=SPH+CYL.$\sin^2$(AXE)+ADD, with SPH, CYL, AXE and ADD respectively the sphere, the cylinder, the axe and the addition of the wearer prescription;
C is a parameter, its value is comprised between −0.5 and −0.05; and
G represents the wrap angle of the chosen spectacle frame.

3. The method according to claim 1, wherein $$g = P_X \times \frac{g_1 \cdot (1 + B_{1.53} \cdot P_X \times g_2)}{(n-1)},$$

where $g_1$ and $g_2$ are constants, with $3E^{-4} \leq g_1 \leq 9E^{-4}$, and $-4E^{-3} \leq g_2 \leq -1E^{-3}$.

4. The method according to claim 1, wherein said right inset (I$^r$) is determined using $f=[((CC^r+DVO^r)-LP^r.\sin(T^r))^2+(LP^r.\cos(T^r))^2]^{1/2}+f_1.e^r$ with $0.5 \leq f_1 \leq 1.5$, and said left inset (I$^l$) is determined using $f=[((CC^l+DVO^l)-LP^l.\sin(T^l))^2+(LP^l.\cos(T^l))^2]^{1/2}+f_1.e^l$ with $0.5 \leq f_1 \leq 1.5$.

5. A progressive addition lens manufacturing method, comprising:
providing an order request comprising at least the wearer prescription,
determining the design and optical parameters of at least one progressive addition lens according to the wearer data,
determining the value of the inset of at least one progressive addition lens to be placed before a wearer's eye in a given spectacle frame,
manufacturing at least one progressive addition lens having the determined inset and the calculated design and optical parameters,
wherein the value of the inset of a progressive addition lens is determined using a determination method implemented by computer means, the determination method comprising:
providing convergence data,
determining from the convergence data the inset of the progressive addition lens considering at least the convergence data, the prismatic effect of the progressive addition lens and at least one criteria in the list consisting of:
the monocular pupillary distance of the wearer's eye in far vision,
the distance between the center of rotation and the cornea of the wearer's eye,
the distance between the cornea of the wearer's eye and a plan defined for the measurement of the monocular pupillary distance,
the distance between the cornea of the wearer's eye and the lens at the level of the fitting cross of the progressive addition lens when the wearer is wearing the lens in the given spectacle frame, and
the thickness of the progressive addition lens at the prism reference point, and
wherein the right inset (I$^r$) of a right progressive addition lens and/or the left inset (I$^l$) of a left progressive addition lens are determined by:

$$I^r = \left\{ \frac{EP^r - \Delta S}{1 + \frac{W^r}{f(CC^r, DVO^r, e^r, LP^r, T^r, n^r, Y^r_{VP}, P^r_y)} - W^r \cdot g(n^r, B^r_{1.53}, P^r_x)} + C \right\} \cdot \cos(G^r),$$

$$I^l = \left\{ \frac{EP^l + \Delta S}{1 + \frac{W^l}{f(CC^l, DVO^l, e^l, LP^l, T^l, n^l, Y^l_{VP}, P^l_y)} - W^l \cdot g(n^l, B^l_{1.53}, P^l_x)} + C \right\} \cdot \cos(G^l)$$

where
EP$^r$ and EP$^l$ are the monocular pupillary distance of right and left eyes of the wearer in far vision, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l,$$

where
$\Delta EP^l$ and $\Delta EP^r$ the monocular pupillary convergence of the left and right eyes,
CC$^l$ and CC$^r$ the distance between the center of rotation of the eye and the cornea for the left and right eyes, DVO_MES$^l$ and DVO_MES$^r$ the distances between the cornea and the plan defined for the measurement of the monocular pupillary distance for the left and right eyes, DVO$^l$ the distance between the cornea of the left eye and the progressive addition lens at the level of the fitting cross of the progressive addition lens when the wearer is wearing the left progressive addition lens in the given spectacle frame, DVO$^r$ the distance between the cornea of the right eye and the progressive addition lens at the level of the fitting cross of the progressive addition lens when the wearer is wearing the right progressive addition lens in the given spectacle frame, and e$^l$ and e$^r$ the thickness of the left and right progressive addition lens at the prism reference point;

f is, for each of the left and right eyes and lenses, a function of:

the distance between the center of rotation of the eye and the cornea, the distance between the cornea and the lens at the level of the fitting cross of the progressive addition lens when the wearer is wearing the progressive addition lens in the given spectacle frame, the thickness e$^l$, e$^r$ of the lens at the prism reference point, the progression length LP$^l$, LP$^r$ of the progressive addition lens, the pantoscopic angle T$^l$, T$^r$ of the chosen spectacle frame, the vertical position Y$^l_{VP}$, Y$^r_{VP}$ of the near vision point of the left and right progressive addition lens relative to the prism reference point, and Py=SPH+CYL.cos$^2$(AXE)+ADD, with SPH, CYL, AXE and ADD respectively the sphere, the cylinder, the axe and the addition of the wearer prescription;

g is, for each of the left and right eyes and lenses, a function of:

the value of the base B$_{1.53}^l$, B$_{1.53}^r$ of the front face of the progressive addition lens expressed in diopter using an indice of 1.53, the index n$^l$, n$^r$ of the progressive addition lens, and the value of the parameter P$^l_X$, P$^r_X$ that corresponds to the sum SPH+CYL.sin$^2$(AXE)+ADD, with SPH, CYL, AXE and ADD respectively the sphere, the cylinder, the axe and the addition of the wearer prescription;

C is a parameter, its value is comprised between −0.5 and −0.05; and

G$^l$ and G$^r$ represent the wrap angle of the left and right frames of the chosen spectacle frame.

6. The method according to claim 5, wherein the inset of the progressive addition lens is determined for a wearer's eye by having all the values of the parameters of the right and left side equal to the values of the parameters of the wearer's eye side, and as a consequence:

$$I = \left\{ \frac{EP}{1 + \frac{W}{f(CC, DVO, e, LP, T, n, Y_{VP}, P_y)} - W \cdot g(n, B_{1.53}, P_X)} + C \right\} \cdot \cos(G)$$

where

EP is the monocular pupillary distance of the wearer's eye in far vision, $$W = \frac{EP \cdot (CC + DVO\_MES)}{\Delta EP} - CC - DVO - e,$$

with

EP the monocular pupillary distance of the wearer's eye in far vision,

ΔEP the monocular pupillary convergence,

CC the distance between the center of rotation and the cornea of the wearer's eye, DVO_MES the distance between the cornea of the wearer's eye and the plane defined for the measurement of the monocular pupillary distance, and DVO the distance between the cornea of the wearer's eye and the progressive addition lens at the level of the fitting cross when the wearer is wearing the progressive addition lens in the given spectacle frame, and e the thickness of the progressive addition lens at the prism reference point;

f is a function of:

the distance between the center of rotation and the cornea of the wearer's eye, the distance between the cornea of the wearer's eye and the progressive addition lens at the level of the fitting cross when the wearer is wearing the progressive addition lens in the given spectacle frame, the thickness e of the lens at the prism reference point, the length of progression LP of the progressive addition lens, the pantoscopic angle T of the chosen spectacle frame, the index n of the progressive addition lens, the vertical position Y$_{VP}$ of the near vision point of the progressive addition lens relative to the prism reference point, and Py=SPH+CYL.cos$^2$(AXE)+ADD, with SPH, CYL, AXE and ADD respectively the sphere, the cylinder, the axe and the addition of the wearer prescription;

g is a function of:

the value of the base B$_{1.53}$ of the front face of the lens expressed in diopter using an indice of 1.53, the index n of the progressive addition lens, and P$_X$=SPH+CYL.sin$^2$(AXE)+ADD, with SPH, CYL, AXE and ADD respectively the sphere, the cylinder, the axe and the addition of the wearer prescription;

C is a parameter, its value is comprised between −0.5 and −0.05; and

G represents the wrap angle of the chosen spectacle frame.

7. The method according to claim 5, wherein $$g = P_X \times \frac{g_1 \cdot (1 + B_{1.53} \cdot P_X \times g_2)}{(n-1)},$$

where g$_1$ and g$_2$ are constants, with $3E^{-4} \leq g_1 \leq 9E^{-4}$, and $-4E^{-3} \leq g_2 \leq -1E^{-3}$.

8. A progressive addition lens design method comprising the steps of:

providing an order request comprising at least the wearer prescription, determining the design and optical parameters of at least one progressive addition lens according to the wearer data, determining the value of the inset of at least one progressive addition lens according to claim 5.

9. A method of ordering a progressive addition lens comprising the step of:
   determining the monocular pupillary distance in far vision,
   sending an order request for at least one progressive addition lens comprising at least the wearer data and the monocular pupillary distance, and
   receiving the at least one progressive addition lens,
   wherein the inset of the progressive addition lens is determined according to claim 5.

10. The method according to claim 5, wherein said right inset ($I^r$) is determined using $$f = [((CC^r + DVO^r) - LP^r \cdot \sin(T^r))^2 + (LP^r \cdot \cos(T^r))^2]^{\frac{1}{2}} + f_1 \cdot e^r + f_2 \cdot \frac{(Y^r_{VP})^2}{(n^r - 1)} P^r_Y$$

with $0.5 \leq f_1 \leq 1.5$, $-3.E^{-3} \leq f_2 \leq -0.5E^{-3}$, and said left inset ($I^l$) is determined using $$f = [((CC^l + DVO^l) - LP^l \cdot \sin(T^l))^2 + (LP^l \cdot \cos(T^l))^2]^{\frac{1}{2}} + f_1 \cdot e^l + f_2 \cdot \frac{(Y^l_{VP})^2}{(n^l - 1)} P^l_Y$$

with $0.5 \leq f_1 \leq 1.5$, $-3.E^3 \leq f_2 \leq -0.5E^{-3}$.

11. A progressive addition lens manufacturing method, comprising:
   providing an order request comprising at least the wearer prescription,
   determining the design and optical parameters of at least one progressive addition lens according to the wearer data,
   determining the value of the inset of at least one progressive addition lens to be placed before a wearer's eye in a given spectacle frame,
   manufacturing at least one progressive addition lens having the determined inset and the calculated design and optical parameters,
   wherein the value of the inset of a progressive addition lens is determined using a determination method implemented by computer means, the determination method comprising:
   providing convergence data,
   determining from the convergence data the inset of the progressive addition lens considering at least the convergence data, the prismatic effect of the progressive addition lens and at least one criteria in the list consisting of:
   the monocular pupillary distance of the wearer's eye in far vision,
   the distance between the center of rotation and the cornea of the wearer's eye,
   the distance between the cornea of the wearer's eye and a plan defined for the measurement of the monocular pupillary distance,
   the distance between the cornea of the wearer's eye and the lens at the level of the fitting cross of the progressive addition lens when the wearer is wearing the lens in the given spectacle frame, and
   the thickness of the progressive addition lens at the prism reference point, and
   wherein the right inset ($I^r$) of a right progressive addition lens and/or the left inset ($I^l$) of a left progressive addition lens are determined by:

$$I^r = \frac{EP^r - \Delta S}{1 + \frac{W^r}{CC^r + DVO^r} - W^r \cdot P^r},$$

$$I^l = \frac{EP^l + \Delta S}{1 + \frac{W^l}{CC^l + DVO^l} - W^l \cdot P^l}$$

where
   $EP^r$ and $EP^l$ are the monocular pupillary distance of right and left eyes of the wearer in far vision,
   $P^r$ and $P^l$ are the average power in the near vision zone of the right and left progressive addition lens, $$\Delta S = \frac{(EP^l + EP^r)}{1 + \frac{\Delta EP^r}{\Delta EP^l} \times \frac{CC^l + DVO\_MES^l}{CC^r + DVO\_MES^r}} - EP^l$$

$$W^r = \frac{(EP^l + EP^r)}{\frac{\Delta EP^l}{CC^l + DVO\_MES^l} + \frac{\Delta EP^r}{CC^r + DVO\_MES^r}} - CC^r - DVO^r - e^r$$

$$W^l = \frac{(EP^l + EP^r)}{\frac{\Delta EP^l}{CC^l + DVO\_MES^l} + \frac{\Delta EP^r}{CC^r + DVO\_MES^r}} - CC^l - DVO^l - e^l,$$

with
   $\Delta EP^l$ and $\Delta EP^r$ the monocular pupillary convergence of the left and right eyes,
   $CC^l$ and $CC^r$ the distance between the center of rotation of the eye and the cornea for the left and right eyes,
   $DVO\_MES^l$ and $DVO\_MES^r$ the distances between the cornea and the plan defined for the measurement of the monocular pupillary distances for the left and right eyes,
   $DVO^l$ the distance between the cornea of the left eye and the progressive addition lens at the level of the fitting cross of the progressive addition lens when the wearer is wearing the left lens in the given spectacle frame,
   $DVO^r$ the distance between the cornea of the right eye and the progressive addition lens at the level of the fitting cross of the progressive addition lens when the wearer is wearing the right lens in the given spectacle frame, and
   $e^l$ and $e^r$ the thickness of the left and right progressive addition lens at the prism reference point.

12. The method according to claim 11, wherein the inset of the lens is determined for a wearer's eye by having all the values of the parameters of the right and left side equal to the values of the parameters of the wearer's eye side, and as a consequence:

$$I = \frac{EP}{1 + \frac{W}{CC+DVO} - W \cdot P}$$

where
- EP is the monocular pupillary distance of the wearer's eye in far vision,
- P is the average power in the near vision zone of the progressive addition lens, and $$W = \frac{EP \cdot (CC + DVO\_MES)}{\Delta EP} - CC - DVO - e,$$

with
- $\Delta EP$ the monocular pupillary convergence,
- CC the distance between the centre of rotation and the cornea of the wearer's eye,
- DVO_MES the distance between the cornea of the wearer's eye and the plan defined for the measurement of the monocular pupillary distance,
- DVO the distance between the cornea of the wearer's eye and the progressive addition lens at the level of the fitting cross when the wearer is wearing the lens in the given spectacle frame, and
- e the thickness of the progressive addition lens at the prism reference point.

\* \* \* \* \*